United States Patent
Huang et al.

(10) Patent No.: US 11,973,360 B2
(45) Date of Patent: Apr. 30, 2024

(54) BATTERY PROTECTION CHARGING METHOD AND SYSTEM THEREOF

(71) Applicant: ASUSTeK COMPUTER INC., Taipei (TW)

(72) Inventors: Ming-Hsuan Huang, Taipei (TW); Wen-Hsiang Yang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 300 days.

(21) Appl. No.: 17/184,741

(22) Filed: Feb. 25, 2021

(65) Prior Publication Data

US 2021/0281086 A1 Sep. 9, 2021

(30) Foreign Application Priority Data

Mar. 4, 2020 (TW) ................... 109107151

(51) Int. Cl.
*H02J 7/00* (2006.01)

(52) U.S. Cl.
CPC .......... *H02J 7/0029* (2013.01); *H02J 7/0049* (2020.01); *H02J 7/007182* (2020.01); *H02J 7/007194* (2020.01)

(58) Field of Classification Search
CPC .............. H02J 7/0029; H02J 7/007194; H02J 7/007182; H02J 7/0049
See application file for complete search history.

(56) References Cited

U.S. PATENT DOCUMENTS

| | | | |
|---|---|---|---|
| 6,194,874 B1 * | 2/2001 | Kalogeropoulos | H02J 7/0071 320/160 |
| 10,916,812 B2 | 2/2021 | Chen | |
| 2009/0146826 A1 * | 6/2009 | Gofman | H02J 7/007192 340/636.2 |
| 2012/0025771 A1 * | 2/2012 | Bhardwaj | H02J 7/0025 320/128 |
| 2013/0049702 A1 * | 2/2013 | Dai | H02J 7/04 320/137 |
| 2014/0167705 A1 | 6/2014 | Chang et al. | |
| 2020/0191873 A1 * | 6/2020 | Yoshida | G01R 31/367 |

FOREIGN PATENT DOCUMENTS

| | | |
|---|---|---|
| CN | 103794827 A | 5/2014 |
| CN | 109494843 A | 3/2019 |
| CN | 109671997 A | 4/2019 |
| CN | 110247453 A | 9/2019 |

* cited by examiner

*Primary Examiner* — Drew A Dunn
*Assistant Examiner* — Pamela J Jeppson
(74) *Attorney, Agent, or Firm* — McClure, Qualey & Rodack, LLP (57) ABSTRACT

A battery protection charging method and a charging system thereof are provided. The battery protection charging method includes obtaining an operation parameter of a battery. When a first protection condition is satisfied, a charging voltage of the battery is reduced to a first voltage. When a second protection condition is satisfied, the charging voltage of the battery is reduced to a second voltage. The second voltage is lower than the first voltage. The first (second) protection condition includes the cycle-life count is higher than a first (second) cycle-life threshold, the high voltage cumulative time is higher than a first (second) high voltage time threshold, and the high voltage-temperature cumulative time is higher than a first (second) high voltage-temperature time threshold.

10 Claims, 5 Drawing Sheets

BATTERY PROTECTION CHARGING METHOD AND SYSTEM THEREOF

CROSS-REFERENCE TO RELATED APPLICATION

This application claims the priority benefit of Taiwan application serial 109107151, filed on Mar. 4, 2020. The entirety of the above-mentioned patent application is hereby incorporated by reference herein and made a part of specification.

BACKGROUND OF THE INVENTION

Field of the Invention

The disclosure relates to a battery charging technology and, more particularly, to a battery protection charging method and a system thereof.

Description of the Related Art

Many electronic devices include batteries. With continuous innovation of electronic devices, the applicable functions are expensed and the efficiency is also enhanced. As a result, the battery consumption of electronic devices is high. However, after a long-time use, battery swollen or a decrease of a battery capacity occurs due to the ageing of the battery, and the battery needs to be charged or replaced frequently.

BRIEF SUMMARY OF THE INVENTION

A battery protection charging method and a battery protection charging system are provided to extend the shelf life of a battery and reduce the risk of battery aging or swollen.

According to an aspect of the disclosure, a battery protection charging method is provided. A battery protection charging method comprises obtaining an operation parameter of a battery, the operation parameter of the battery includes a cycle-life count of the battery, a temperature of the battery, a high voltage cumulative time of the battery at a full charged capacity, and the high voltage-temperature cumulative time of the battery when the temperature is higher than a first temperature and the battery has the full charged capacity; when a first protection condition is satisfied, a charging voltage of the battery is reduced to a first voltage, wherein the first protection condition includes the cycle-life count is higher than a first cycle-life threshold, the high voltage cumulative time is higher than a first high voltage time threshold, and the high voltage-temperature cumulative time is higher than a first high voltage-temperature time threshold; and when a second protection condition is satisfied, the charging voltage of the battery is reduced to a second voltage, wherein the second voltage is lower than the first voltage, the second protection condition includes the cycle-life count is higher than a second cycle-life threshold, the high voltage cumulative time is higher than a second high voltage time threshold, and the high voltage-temperature cumulative time is higher than a second high voltage-temperature time threshold, wherein the second cycle-life threshold is higher than the first cycle-life threshold, the second high voltage time threshold is higher than the first high voltage time threshold, and the second high voltage-temperature time threshold is higher than the first high voltage-temperature time threshold.

According to an aspect of the disclosure, a battery protection charging system is provided. A battery protection charging system comprises a battery module; a controller connected to the battery module and obtaining the operation parameter of the battery module, when a first protection condition is satisfied, a charging voltage of the battery module is reduced to a first voltage, when a second protection condition is satisfied, the charging voltage of the battery module is reduced to a second voltage, wherein the second voltage is lower than the first voltage; the operation parameter of the battery module includes a cycle-life count of the battery module, a temperature of the battery module, a high voltage cumulative time of the battery module at a full charged capacity, and the high voltage-temperature cumulative time of the battery module when the temperature is higher than a first temperature and the battery module has the full charged capacity; the first protection condition includes the cycle-life count which is higher than a first cycle-life threshold, the high voltage cumulative time is higher than a first high voltage time threshold, and the high voltage-temperature cumulative time is higher than a first high voltage-temperature time threshold; the charging voltage of the battery is reduced to a second voltage, wherein the second voltage is lower than the first voltage, the second protection condition includes the cycle-life count which is higher than a second cycle-life threshold, the high voltage cumulative time is higher than a second high voltage time threshold, and the high voltage-temperature cumulative time is higher than a second high voltage-temperature time threshold; wherein the second cycle-life threshold is higher than the first cycle-life threshold, the second high voltage time threshold is higher than the first high voltage time threshold, and the second high voltage-temperature time threshold is higher than the first high voltage-temperature time threshold.

In summary, according to embodiments, a charging voltage of the battery is reduced by detecting battery parameters, such as battery usage time, a battery temperature, a cycle-life count of the battery, and a period of the battery with a full charged capacity. According to different usage habits of users, the thresholds are adjusted, and the charging voltage is reduced in multiple steps to extend the life of the battery.

These and other features, aspects and advantages of the present invention will become better understood with regard to the following description, appended claims, and accompanying drawings.

DETAILED DESCRIPTION OF THE EMBODIMENTS

Figure 1:
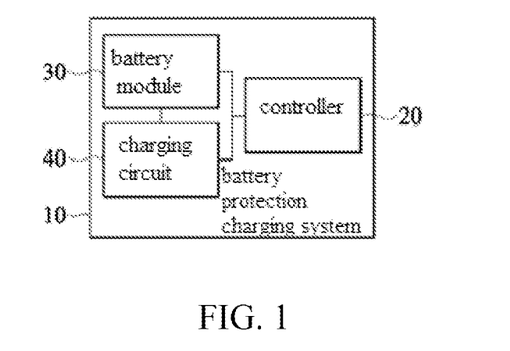
FIG. 1 is a block diagram showing a battery protection charging system in an embodiment.
Figure 2:
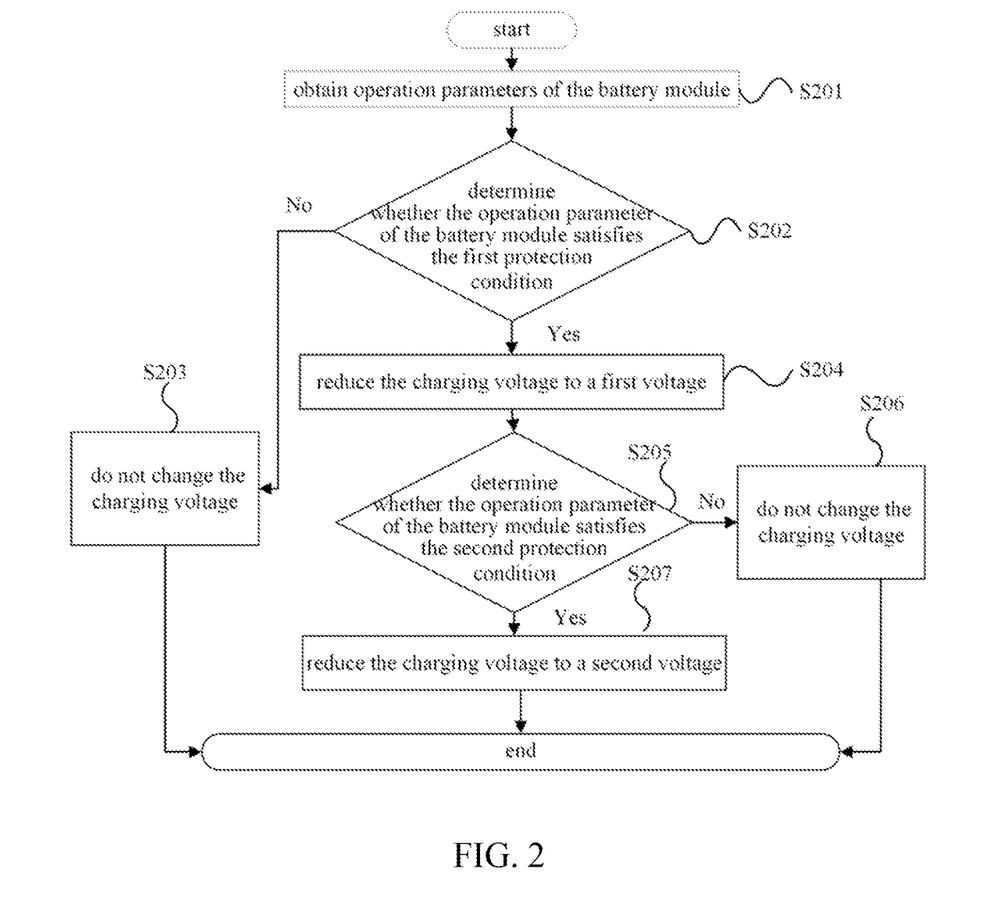
FIG. 2 is a flow chart showing a battery protection charging method in an embodiment.

Please refer to FIG. 1 and FIG. 2. FIG. 1 is a block diagram showing a battery protection charging system in an embodiment. FIG. 2 is a flow chart showing a battery protection charging method in an embodiment. A battery protection charging system 10 is adapted to an electronic device to execute a battery protection charging method. In an embodiment, the electronic device is a phone, a tablet computer, or a notebook computer, which is not limited herein. A battery protection charging system 10 includes a controller 20, a battery module 30, and a charging circuit 40. The battery module 30 is used to store power. The power is provided to the electronic device with the battery protection charging system 10. The charging circuit 40 is used to receive a power source and convert the power source to a charging power to the battery module 30. In an embodiment, the power source is wired or wireless. The controller 20 is connected to the battery module 30 and the charging circuit 40 to execute the battery protection charging method to obtain an operation parameter of the battery module 30 and control a charging voltage output from the charging circuit 40. The charging voltage is a voltage across two poles of the battery module 30. The charging voltage is used to charge the battery module 30.

In an embodiment, the charging voltage is a full charged voltage. The full charged voltage is a voltage difference between two poles of the battery module 30 when the battery capacity reaches the full charged capacity. The full charged capacity is the state that the battery module 30 is fully charged, that is, the relative State-Of-Charge (RSOC) is 100%. In embodiments, the battery capacity is detected via an open circuit voltage method, a coulomb measurement method or a dynamic voltage algorithm fuel gauge method, which is not limited herein.

In an embodiment, the controller 20 is a system processing chip of the electronic device, such as a Central Processing Unit (CPU), a microprocessor, an application-specific integrated circuit (ASIC), a system on a chip (SOC). In an embodiment, the controller 20 is a gauge IC integrated with the battery module 30.

In embodiments, the battery module 30 includes one or more batteries. For example, the battery is a lithium ion battery, a lithium phosphate battery, a lithium polymer battery, a nickel-cadmium battery, a lead-acid battery or any other type of batteries suitable for secondary charging. In an embodiment, the battery module 30 further includes one or more temperature sensors for detecting a temperature of the battery module 30.

Figure 3:
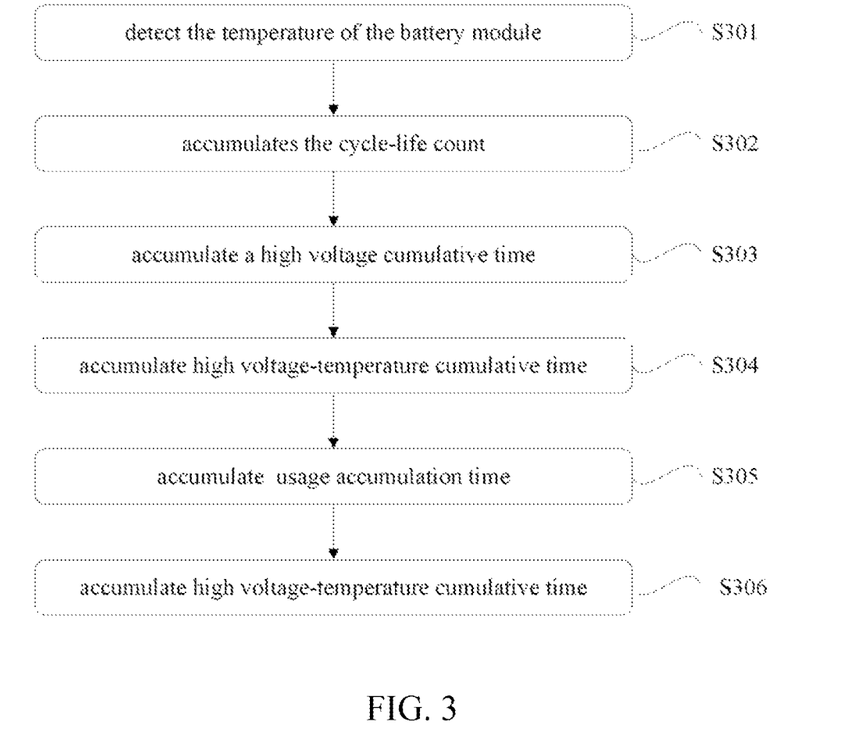
FIG. 3 is a flow diagram showing a method of obtaining operation parameters of a battery module in an embodiment.

Please refer to FIG. 1, FIG. 2, and FIG. 3. FIG. 3 is a flow diagram showing a method of obtaining operation parameters of a battery module in an embodiment. As shown in FIG. 2, when the battery protection charging system 10 starts to charge the battery module 30, step S201 is executed, the controller 20 obtains operation parameters of the battery module 30. In an embodiment, the operation parameter (such as the temperature and the using time of the battery module 30) are continuously collected. In an embodiment, the operation parameter of the battery module 30 is obtained intermittently, such as periodically or non-periodically.

In FIG. 3, the way that the controller 20 obtains the operation parameter of the battery module 30 is further described. In step S301, the temperature of the battery module 30 is detected. The controller 20 obtains the temperature of the battery module 30 via the temperature sensor of the battery module 30.

In step S302, the controller 20 accumulates the cycle-life count of the battery module 30. The cycle-life count is the count of the complete charge and discharge of the battery module 30. For example, the battery capacity is changed from a low capacity to a high capacity (or a full charged capacity), and then changed from the high capacity (or the full charged capacity) to the low capacity. In an embodiment, the count of the complete charge and discharge is the accumulation of the change of the battery capacity. In an embodiment, when the battery module 30 is charged, the battery capacity changes to a preset threshold (for example, the accumulation of the change reaches 95% of the battery capacity), a complete charge is finished.

In step S303, the controller 20 accumulates the period that the battery capacity of the battery module 30 keeps at the full charged capacity (called as "a high voltage cumulative time" hereinafter).

In step S304, the controller 20 accumulates the period that the temperature of the battery module 30 is larger than the first temperature and the battery is at the full charged capacity (called as "high voltage-temperature cumulative time").

In step S305, the controller 20 accumulates usage accumulation time of the battery module 30. In detail, when the power or the current is supplied to the battery protection charging system 10 or an electronic device with the battery protection charging system 10 via the battery module 30, a counter of the controller 20 accumulates the usage time. In an embodiment, when the electronic device is powered on or at a stand by state, the controller 20 accumulates the usage accumulation time.

In step S306, the controller 20 accumulates the period that the temperature of the battery module 30 is higher than the second temperature (called as "high temperature accumulates time"). In an embodiment, the second temperature is higher than the first temperature. In an embodiment, the first temperature is 35° C., and the second temperature is 45° C.

In an embodiment, the sequence of step S302 to step S306 is not limited herein. In an embodiment, the sequence of step S301 to 303 and the step 305 is not limited herein, and the steps S304 and 306 are executed after step S301. In an embodiment, the steps S301 to S306 are executed simultaneously.

Please refer to FIG. 2. In step S202, the controller 20 determines whether the operation parameter of the battery module 30 satisfies the first protection condition (as shown in sheet 1). When the operation parameter is not satisfied the first protection condition, the controller 20 does not change the charging voltage output from the charging circuit 40 (step S203). When the operation parameter is satisfied at least a situation of the first protection condition, the controller 20 reduces the charging voltage output from the charging circuit 40 to a first voltage (step S204).

In an embodiment, the unreduced charging voltage is the max voltage supported by the battery module 30. For example, the max charging voltage supported by the lithium battery is 4.35V or 4.37V, which is not limited herein. In an embodiment, the reduced range of the charging voltage is user-defined, such as 50 mV, and then the first voltage is reduced to 4.3V.

--- the cycle-life count is higher than a first cycle-life threshold
the high voltage cumulative time is higher than a first high voltage time threshold
the high voltage-temperature cumulative time is higher than the first high voltage-temperature time threshold
the usage accumulation time is higher than a first usage time threshold
the high temperature accumulates time is higher than a first high temperature time threshold

---

In an embodiment, when the cycle-life count of the first protection condition is higher than the first cycle-life threshold, the high voltage cumulative time is higher than the first high voltage time threshold, and the high voltage-temperature cumulative time is higher than the first high voltage-temperature time threshold, the controller 20 reduces the charging voltage output from the charging circuit 40 to the first voltage. In an embodiment, when four situations of the first protection condition are satisfied, the controller 20 reduces the charging voltage output from the charging circuit 40 to the first voltage. In an embodiment, all situations of the first protection condition are satisfied, the controller 20 reduces the charging voltage output from the charging circuit 40 to the first voltage.

During many cycles of charging and discharging of the battery, the temperature of battery keeps high for a long time (for example, the temperature of the mobile phone is increased due to the high image quality of games), the battery is at a high-charge state for a long time (for example, when the mobile phone is fully charged, the mobile phone is still connected to the power supply for a long time without being unplugged), the mobile phone is at a relative high temperature and high charge state for a long time (for example, the mobile phone is connected to the power supply as a wireless router for a long time), or the battery is used for a long time, the battery is easily aged. As a result, the threshold (such as the first cycle-life threshold, the first high voltage time threshold, the first high voltage-temperature time threshold, the first usage time threshold, or the first high temperature time threshold) is set. When a corresponding value exceeds the threshold, the charging voltage is reduced. Then, the actual battery capacity corresponding to the full charged capacity of the battery module 30 is reduced, and the life of the battery module 30 is extended. For example, when the charging voltage is not reduced, the battery capacity of the full charged capacity is 5000 mAh. After the charging voltage is reduced, the battery capacity of the full charged capacity is 4500 mAh. As a result, the time of the state that the battery module is at a high voltage and high capacity is shortened, and the battery life is extended.

In step S205, the controller 20 determines whether the operation parameter of the battery module 30 satisfies the second protection condition (as shown at sheet 2). When the operation parameter of the battery module 30 is not satisfied with the second protection condition, the controller 20 does not change the charging voltage output from the charging circuit 40 (step S206). When the operation parameter of the battery module 30 satisfies at least one situation of the second protection condition, the controller 20 reduces the charging voltage output from the charging circuit 40 to the second voltage (step S207). The second voltage is lower than the first voltage. That is, via the first protection condition and the second protection condition, the charging voltage of the battery module 30 is adjusted in two steps to extend the service life of the battery module 30.

--- the cycle-life count is higher than a second cycle-life threshold
the high voltage cumulative time is higher than a second high voltage time threshold
the high voltage-temperature cumulative time is higher than a second high voltage-temperature time threshold
the usage accumulation time is higher than a second usage time threshold
the high temperature accumulates time is higher than a second high temperature time threshold

---

In an embodiment, when the cycle-life count of the second protection condition is higher than the second cycle-life threshold, the high voltage cumulative time is higher than the second high voltage time threshold, and the high voltage-temperature cumulative time is higher than the second high voltage-temperature time threshold, the controller 20 reduces the charging voltage output from the charging circuit 40 to the second voltage. In an embodiment, when at least four situations of the second protection condition are satisfied, the controller 20 reduces the charging voltage output from the charging circuit 40 to the second voltage. In an embodiment, when all situations of the second protection condition are satisfied, the controller 20 reduces the charging voltage output from the charging circuit 40 to the second voltage.

In an embodiment, the second cycle-life threshold is higher than the first cycle-life threshold, the second high voltage time threshold is higher than the first high voltage time threshold, the second high voltage-temperature time threshold is higher than the first high voltage-temperature time threshold, the second usage time threshold is higher than the first usage time threshold, and the second high temperature time threshold is higher than the first high temperature time threshold. For example, the first high voltage time threshold is six months, the second high voltage time threshold is twelve months, the high temperature time threshold is six months, the second high temperature time threshold is twelve months, the first usage time threshold is twelve months, and the second usage time threshold is eighteen months, which is not limited herein.

Via the conditions in two steps, the threshold is set more stringent (not easy to be satisfied). When the battery module 30 satisfies at least one situation of the second protection condition, the state of the battery module 30 is not good, and the battery is gradually aged. Thus, the charging voltage is reduced lower, that is, the first voltage is reduced to the second voltage. In other words, the actual battery capacity corresponding to the full charged capacity of the battery module 30 is reduced to extend the life of the battery module 30.

In an embodiment, the range reduced from the charging voltage to the first voltage is the same as the range reduced from the first voltage to the second voltage. For example, the max charging voltage supported by the battery module 30 (for example, 4.35V for a lithium battery) is reduced by 50 mV. Then, the first voltage is 4.3V. The first voltage is further reduced by 50 mV. Then, the second voltage is 4.25V. In an embodiment, the reduced range of the first voltage in step S204 and the reduced range of the second voltage in step S207 are different.

In an embodiment, after step S201, step S202 and step S205 are executed (not shown). In an embodiment, when the charging voltage is already reduced to the first voltage, in the next charging operation, step S205 (not shown) is executed after step S201.

In an embodiment, the charging mode of the battery module 30 is a Constant Current-Constant Voltage (CC-CV) mode. As a result, the first voltage and the second voltage are set as the thresholds at two steps in the circuit design, respectively, to make the battery voltage of the battery module 30 reach the full charged voltage. For example, at the constant current charging mode, the first voltage is set as 4.27V, the second voltage is set as 4.22V. In the constant voltage charging mode, the first voltage is set as 4.3V, the second voltage is set as 4.25V to make the battery voltage reach the full charged voltage (4.3V or 4.25V).

In an embodiment, the first cycle-life threshold and the second cycle-life threshold are adjusted according to the battery capacity of the battery module 30. In an embodiment, the larger the battery capacity is, the less the cycle-life count is. However, within the usage time of the battery module 30 increase, the battery module 30 is gradually aging. Consequently, the first cycle-life threshold and the second cycle-life threshold are adjusted according to the value of the battery capacity. In an embodiment, when the battery capacity is lower than 3000 mAh, the first cycle-life threshold and the second cycle-life threshold are set between 200 and 225. When the battery capacity is between 3000 and 4000 mAh, the first cycle-life threshold and the second cycle-life threshold are set between 175 and 200. When the battery capacity is between 4000 and 5000 mAh, the first cycle-life threshold and the second cycle-life threshold are set between 150 and 175. When the battery capacity is between 5000 and 6000 mAh, the first cycle-life threshold and the second cycle-life threshold are set between 125 and 150. When the battery capacity is higher than 6000 mAh, the first cycle-life threshold and the second cycle-life threshold are set between 100 and 125, which is not limited herein.

In an embodiment, the thresholds disclosed herein are adjustable according to a user behavior, such as the first cycle-life threshold and the second cycle-life threshold, the first high voltage time threshold and the second high voltage time threshold, the first high voltage-temperature time threshold and the second high voltage-temperature time threshold, the first usage time threshold and the second usage time threshold, and the first high temperature time threshold and the second high temperature time threshold. Taking a mobile phone with the battery protection charging system 10 as an example, the temperature of the battery module 30 increases easily when users play games with the mobile phone frequently. Consequently, according to the user behavior, the first high temperature time threshold and the second high temperature time threshold are set more stringent (not easy to be satisfied). In an embodiment, when the original first high temperature time threshold is six months and the original second high temperature time threshold is twelve months, the first high temperature time threshold is adjusted to three months, and the second high temperature time threshold is adjusted to six months.

In an embodiment, the thresholds disclosed herein are adjustable according to a type of an electronic device, such as the first cycle-life threshold and the second cycle-life threshold, the first high voltage time threshold and the second high voltage time threshold, the first high voltage-temperature time threshold and the second high voltage-temperature time threshold, the first usage time threshold and the second usage time threshold, and the first high temperature time threshold and the second high temperature time threshold. Taking the mobile phone with the battery protection charging system 10 as an example, when the mobile phone is a gaming mobile phone, the battery module 30 is easily at a high temperature state. As a result, according to the type of the electronic device, the first high temperature time threshold and the second high temperature time threshold are set more stringent (not easy to be satisfied).

In an embodiment, via the combination and assistance among these thresholds, the status confirmation of the battery module 30 is more accurately. And within the charging voltage of the controller 20 adjusts correspondingly, the life of the battery module 30 is thus extended.

In an embodiment, the battery protection charging method further comprises the following steps. When the charging voltage is reduced to the first voltage, the controller 20 looks up a first comparison table for the battery capacity corresponding to the battery voltage of the battery module 30. The battery capacity of the battery module 30 is displayed at a human interface. When the battery voltage reaches the first voltage, the battery capacity shows the full charged capacity is reached. In an embodiment, the battery module 30 is the lithium battery. The lithium battery is conventionally characterized in that the higher the battery voltage, the higher the battery capacity. Moreover, the full charged capacity and the full charged voltage of the lithium battery are conventionally preset by the manufacturer. The battery capacity that displayed at the human interface is 100% when the battery is in full charged. However, when the full charged voltage is adjusted lower, it wrongly shows that the full charged capacity of the battery that preset by the manufacturer is not reached at the human interface. According to the method disclosed above, the first comparison table is generated by complying with the adjusted battery capacities within different battery voltages corresponding to various sizes of batteries. Thus to eliminate the problem that wrongly showing full charged capacity that preset by at the manufacturer is not reached at the human interface. Therefore, when the battery voltage is the first voltage, it means that the battery voltage corresponds to the full charged capacity, and the battery capacity displayed at the human interface is 100%.

In an embodiment, the battery protection charging method further includes the step that when the charging voltage is reduced to the second voltage, the controller 20 looks up a second comparison table for the battery capacity corresponding to the battery voltage of the battery module 30, and the battery capacity of the battery module 30 is displayed at a human interface. When the battery voltage reaches the second voltage, the battery capacity shows the full charged capacity is reached. The difference between this embodiment and the foregoing embodiment is that the battery capacity corresponding to the battery voltage of the second comparison table is different from that of the first comparison table, and the full charged capacity of the second comparison table corresponds to the second voltage.

In an embodiment, the human interface is a display interface including a liquid crystal screen or a touch screen, which is not limited herein.

Figure 4:
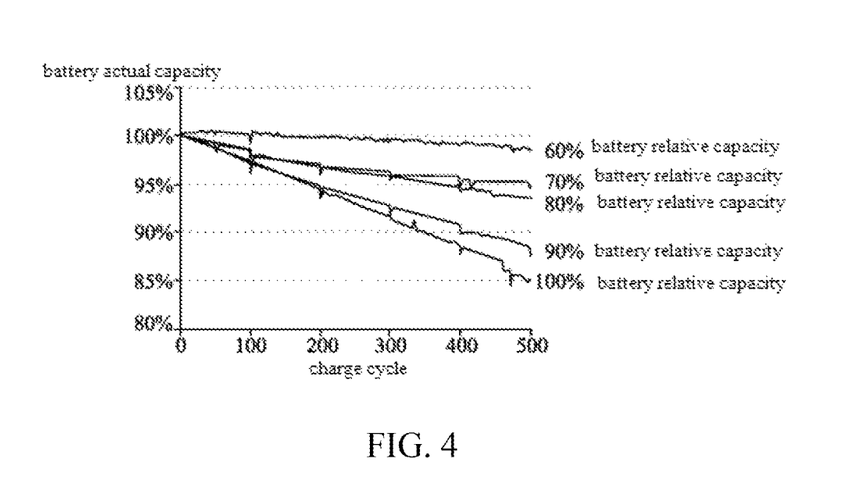
FIG. 4 is a schematic diagram showing a relationship between a charge cycle and a battery capacity at different charging voltages in an embodiment.
Figure 5:
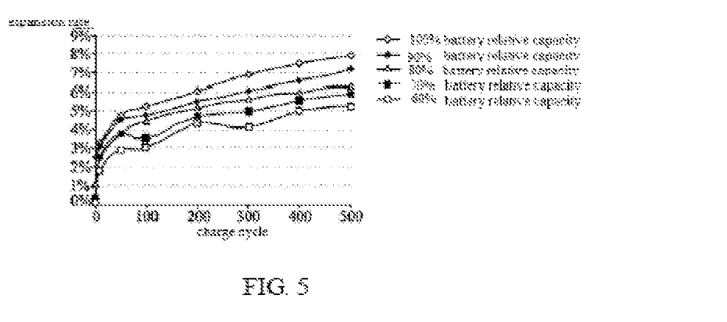
FIG. 5 is a schematic diagram showing a relationship between a charge cycle and battery swelling at different charging voltages in an embodiment.
Figure 6:
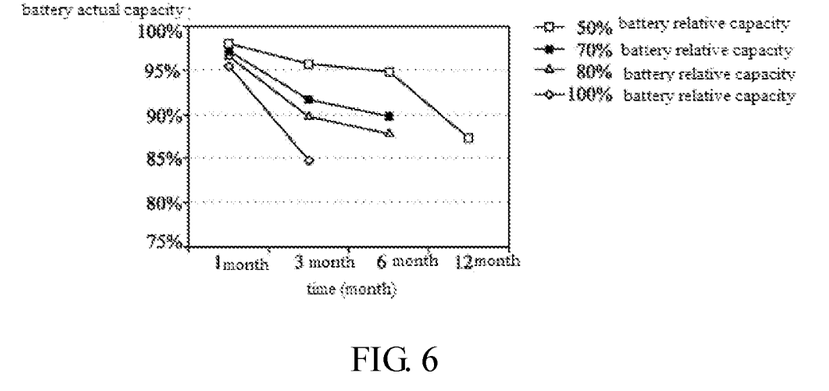
FIG. 6 is a schematic diagram showing a relationship between time and a battery capacity at 45° C. (high temperature) and a high charging voltage in an embodiment.
Figure 7:
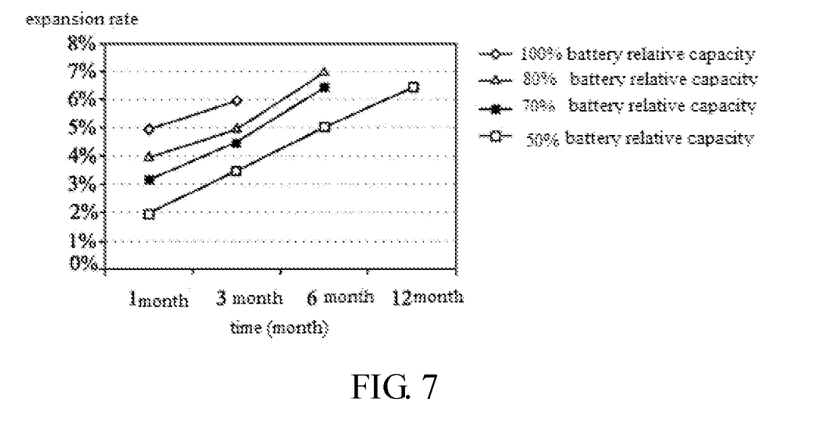
FIG. 7 is a schematic diagram showing a relationship between time and a battery swelling at 45° C. (high temperature) and a high charging voltage in an embodiment.
Figure 8:
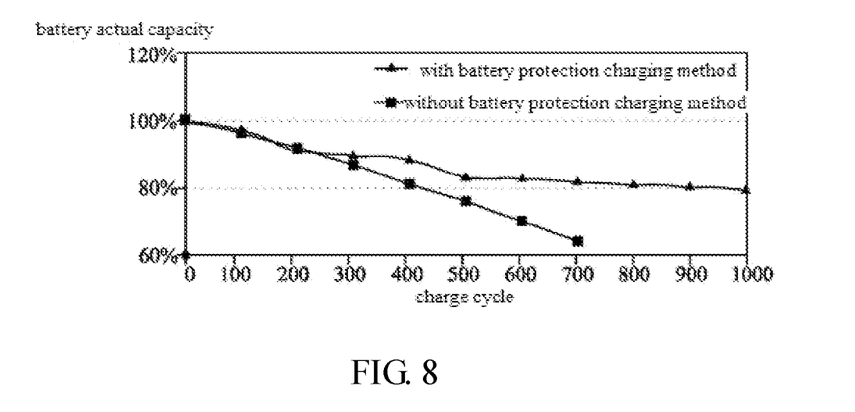
FIG. 8 is a schematic diagram showing a difference of a battery capacity with and without a battery protection charging method in an embodiment.
Figure 9:
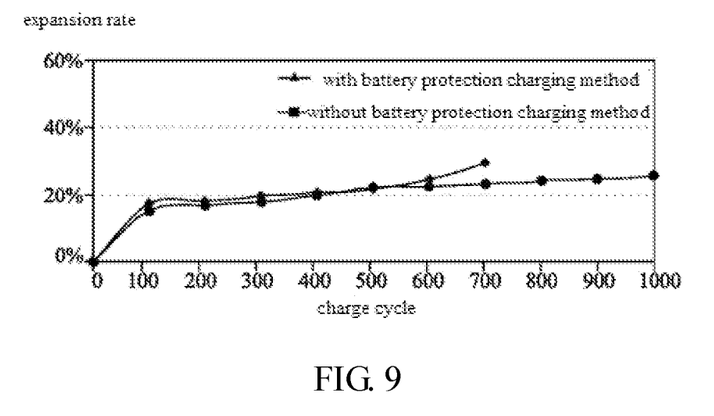
FIG. 9 is a schematic diagram showing a difference of a swollen battery with and without a battery protection charging method in an embodiment.

Please refer to FIG. 4 to FIG. 9. The figures are schematic diagram of experimental data. FIG. 4 is a schematic diagram showing a relationship between a charge cycle and a battery capacity at different charging voltages in an embodiment. FIG. 5 is a schematic diagram showing a relationship between a charge cycle and battery swelling at different charging voltages in an embodiment. FIG. 6 is a schematic diagram showing a relationship between time and a battery capacity at 45° C. (high temperature) and a high charging voltage in an embodiment. FIG. 7 is a schematic diagram showing a relationship between time and a battery swelling at 45° C. (high temperature) and a high charging voltage in an embodiment. FIG. 8 is a schematic diagram showing a difference of a battery capacity with and without a battery protection charging method in an embodiment. FIG. 9 is a schematic diagram showing a difference of a battery swelling with and without a battery protection charging method in an embodiment. The higher the battery capacity (the relative capacity of the battery), the larger the full charged voltage and charging voltage. The calculation method of the number of the charging time shown in FIG. 4, FIG. 5, FIG. 8, and FIG. 9 is the number that the battery is changed from zero battery capacity to the preset battery capacity, and then from the preset battery capacity to zero battery capacity. For example, if the battery capacity is preset as 100%, when the battery changes from zero battery capacity to 100%, and then from 100% to zero battery capacity, it means the charge cycle is one.

As shown in FIG. 4 to FIG. 9, when the battery is at a state of a high temperature and high charge cycles for a long time, the actual capacity of the battery is significantly reduced and the thermal swelling rate of the battery is increased. That is, the battery is rapidly aged. Therefore, by setting a variety of thresholds and different conditions for a multi-stage charging voltage reduction, the battery life is extended.

In summary, according to the embodiments, the charging voltage of the battery is reduced by detecting battery parameters, such as the battery usage time, the battery temperature, the cycle-life count of the battery, and the period of the battery with the full charged capacity. According to different usage habits of users, the thresholds are adjusted, and the charging voltage is reduced in multiple steps to extend the life of the battery.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A battery protection charging method, comprising:
    obtaining a plurality of operation parameters of a battery, the plurality of operation parameters of the battery include a cycle-life count of the battery, a temperature of the battery, a high voltage cumulative time of the battery at a full charged capacity, and a high voltage-temperature cumulative time of the battery when the temperature is higher than a first temperature and the battery has the full charged capacity;
    when all of a plurality of first protection conditions are satisfied, a charging voltage of the battery is reduced to a first voltage, the plurality of first protection conditions include that the cycle-life count is higher than a first cycle-life threshold, the high voltage cumulative time is higher than a first high voltage time threshold, and the high voltage-temperature cumulative time is higher than a first high voltage-temperature time threshold; and
    when all of a plurality of second protection conditions are satisfied, the charging voltage of the battery is further reduced to a second voltage, wherein the second voltage is lower than the first voltage, the plurality of second protection conditions include that the cycle-life count is higher than a second cycle-life threshold, the high voltage cumulative time is higher than a second high voltage time threshold, and the high voltage-temperature cumulative time is higher than a second high voltage-temperature time threshold, wherein the second cycle-life threshold is higher than the first cycle-life threshold, the second high voltage time threshold is higher than the first high voltage time threshold, and the second high voltage-temperature time threshold is higher than the first high voltage-temperature time threshold.

2. The battery protection charging method according to claim 1, wherein the plurality of operation parameters of the battery further comprise a usage accumulation time of the battery, the plurality of first protection conditions further comprise the usage accumulation time that is higher than a first usage time threshold, the plurality of second protection conditions further comprise the usage accumulation time that is higher than a second usage time threshold, wherein the second usage time threshold is higher than the first usage time threshold.

3. The battery protection charging method according to claim 2, wherein the step of obtaining the plurality of operation parameters of the battery further comprises accumulating the usage accumulation time of the battery.

4. The battery protection charging method according to claim 1, wherein the plurality of operation parameters of the battery further comprise a high temperature accumulates time where the temperature of the battery is higher than a second temperature, the plurality of first protection conditions further comprise the high temperature accumulates time that is higher than a first high temperature time threshold, the plurality of second protection conditions further comprise the high temperature accumulates time that is higher than a second high temperature time threshold, wherein the second temperature is higher than the first temperature, and the second high temperature time threshold is higher than the first high temperature time threshold.

5. The battery protection charging method according to claim 4, wherein the step of obtaining the plurality of operation parameters of the battery further comprises accumulating the high temperature accumulates time where the temperature of the battery is higher than the second temperature.

6. The battery protection charging method according to claim 1, further comprising:
    looking up a first comparison table for the battery capacity corresponding to the battery voltage of the battery module when the charging voltage is reduced to the first voltage and displaying the battery capacity of the battery at a human interface, wherein the battery capacity shows the full charged capacity when the voltage of the battery reaches the first voltage; and
    looking up a second comparison table for the battery capacity corresponding to the battery voltage of the battery module when the charging voltage is reduced to the second voltage and displaying the battery capacity of the battery at a human interface, wherein the battery capacity shows the full charged capacity when the voltage of the battery reaches the second voltage.

7. The battery protection charging method according to claim 1, wherein the step of obtaining the plurality of operation parameters of the battery further comprises:
    accumulating the cycle-life count of the battery;
    detecting the temperature of the battery;
    accumulating the high voltage cumulative time that the battery has the full charged capacity; and
    accumulating the high voltage-temperature cumulative time that the temperature of the battery is higher than the first temperature and the battery has the full charged capacity.

8. A battery protection charging system, comprising:
    a battery module; and a controller connected to the battery module and configured for obtaining a plurality of operation parameters of the battery module, when all of a plurality of first protection conditions are satisfied, reducing a charging voltage of the battery module to a first voltage, when all of a plurality of second protection conditions are satisfied, further reducing the charging voltage of the battery module to a second voltage, wherein the second voltage is lower than the first voltage;

wherein the plurality of operation parameters of the battery module comprising a cycle-life count of the battery module, a temperature of the battery module, a high voltage cumulative time of the battery module at a full charged capacity, and the high voltage-temperature cumulative time of the battery module when the temperature is higher than a first temperature and the battery module has the full charged capacity;

the plurality of first protection conditions include the cycle-life count is higher than a first cycle-life threshold, the high voltage cumulative time is higher than a first high voltage time threshold, and the high voltage-temperature cumulative time is higher than a first high voltage-temperature time threshold;

the plurality of second protection conditions include the cycle-life count is higher than a second cycle-life threshold, the high voltage cumulative time is higher than a second high voltage time threshold, and the high voltage-temperature cumulative time is higher than a second high voltage-temperature time threshold;

wherein the second cycle-life threshold is higher than the first cycle-life threshold, the second high voltage time threshold is higher than the first high voltage time threshold, and the second high voltage-temperature time threshold is higher than the first high voltage-temperature time threshold.

9. The battery protection charging system according to claim 8, wherein the plurality of operation parameters of the battery module further comprise a usage accumulation time of the battery module and a high temperature accumulates time that the temperature of the battery module is higher than a second temperature, the plurality of first protection conditions further comprise the usage accumulation time that is higher than a first usage time threshold and the high temperature accumulates time that is higher than a first high temperature time threshold, the plurality of second protection conditions further comprise the usage accumulation time that is higher than a second usage time threshold and the high temperature accumulates time that is higher than a second high temperature time threshold, wherein the second temperature is higher than the first temperature, the second usage time threshold is higher than the first usage time threshold, and the second high temperature time threshold is higher than the first high temperature time threshold.

10. The battery protection charging method according to claim 8, wherein when the charging voltage is reduced to the first voltage, the controller looks up a first comparison table for a battery capacity corresponding to a voltage of the battery module, the battery capacity of the battery module is displayed at a human interface, when the voltage of the battery module reaches the first voltage, the battery capacity shows the full charged capacity;

when the charging voltage is reduced to the second voltage, the controller looks up a second comparison table for a battery capacity corresponding to a voltage of the battery module, the battery capacity of the battery module is displayed at a human interface, when the voltage of the battery module reaches the second voltage, the battery capacity shows the full charged capacity.

\* \* \* \* \*